(12) United States Patent
Pepper et al.

(10) Patent No.: US 10,140,636 B2
(45) Date of Patent: Nov. 27, 2018

(54) METHOD OF CLASSIFYING A BILL

(71) Applicant: Mitchell International, Inc., San Diego, CA (US)

(72) Inventors: Noah Mantell Pepper, Portland, OR (US); Charles Cooper Francis, Portland, OR (US); Merritt Laird Quarum, Portland, OR (US)

(73) Assignee: Mitchell International, Inc., San Diego, CA (US)

( * ) Notice: Subject to any disclaimer, the term of this patent is extended or adjusted under 35 U.S.C. 154(b) by 619 days.

(21) Appl. No.: 14/221,183

(22) Filed: Mar. 20, 2014

(65) Prior Publication Data
US 2014/0289083 A1 Sep. 25, 2014

Related U.S. Application Data

(63) Continuation of application No. 12/753,801, filed on Apr. 2, 2010, now abandoned.

(51) Int. Cl.
*G06Q 30/04* (2012.01)
*G06Q 40/00* (2012.01)

(52) U.S. Cl.
CPC .............. *G06Q 30/04* (2013.01); *G06Q 40/12* (2013.12)

(58) Field of Classification Search
CPC ...... G06F 19/328; G06Q 50/22; G06Q 30/04; G06Q 20/102
USPC ....................... 705/34, 311, 400, 2
See application file for complete search history.

(56) References Cited

U.S. PATENT DOCUMENTS

| | | | |
|---|---|---|---|
| 6,789,069 B1 | 9/2004 | Barnhill et al. | |
| 6,826,536 B1 | 11/2004 | Forman | |
| 7,058,585 B1 | 6/2006 | Wood et al. | |
| 7,542,911 B2 | 6/2009 | Barret et al. | |
| 7,702,525 B2 | 4/2010 | Kosinski et al. | |
| 7,813,937 B1 * | 10/2010 | Pathria ................... | G06Q 10/10 705/2 |
| 7,840,455 B1 * | 11/2010 | Venkatasubramanian ................... | G06Q 30/04 705/30 |
| 7,925,519 B2 * | 4/2011 | Greene ................ | G06F 19/328 705/2 |
| 8,209,269 B2 * | 6/2012 | Schoelkopf .......... | G06K 9/6215 706/12 |
| 8,355,926 B1 * | 1/2013 | Hinz ...................... | G16H 40/20 705/2 |
| 8,762,169 B2 * | 6/2014 | Mohlenbrock ........ | G06Q 50/22 705/2 |
| 2003/0158751 A1 | 8/2003 | Suresh et al. | |
| 2004/0093240 A1 * | 5/2004 | Shah ..................... | G06Q 10/00 705/2 |
| 2005/0137912 A1 * | 6/2005 | Rao ........................ | G06Q 10/10 705/4 |
| 2005/0187957 A1 * | 8/2005 | Kramer ................ | H04L 12/1432 |
| 2006/0210133 A1 * | 9/2006 | Krishnan ............. | G06F 19/3406 382/128 |
| 2006/0293922 A1 | 12/2006 | Seare et al. | |

(Continued)

OTHER PUBLICATIONS

U.S. Appl. No. 12/753,801, filed Apr. 2, 2010, 57 Pages.

(Continued)

*Primary Examiner* — Vanel Frenel
(74) *Attorney, Agent, or Firm* — LeClairRyan PLLC

(57) ABSTRACT

Briefly, embodiments of a method of classifying a bill are disclosed.

21 Claims, 10 Drawing Sheets

(56) References Cited

U.S. PATENT DOCUMENTS

| | | | | |
|---|---|---|---|---|
| 2007/0150316 | A1* | 6/2007 | Sanner | G06F 19/328 705/3 |
| 2007/0208594 | A1* | 9/2007 | Yang | G06F 19/328 705/2 |
| 2008/0052231 | A1 | 2/2008 | Moscal et al. | |
| 2008/0183504 | A1* | 7/2008 | Highley | G06F 19/322 705/3 |
| 2008/0255884 | A1 | 10/2008 | Carus et al. | |
| 2009/0307167 | A1* | 12/2009 | Anouar | G06K 9/6231 706/46 |
| 2010/0121178 | A1* | 5/2010 | Krishnan | G06F 19/321 600/411 |
| 2011/0054925 | A1* | 3/2011 | Ghani | G06Q 40/08 705/2 |
| 2011/0119213 | A1* | 5/2011 | Elisseeff | G06F 19/24 706/13 |
| 2011/0203270 | A1* | 8/2011 | Dronniou | F01N 3/0253 60/605.2 |
| 2012/0136777 | A1 | 5/2012 | Hanson | |

OTHER PUBLICATIONS

U.S. Appl. No. 12/753,801: Notice to File Corrected Application Papers.
U.S. Appl. No. 12/753,801: Transmittal Letter, dated Jun. 21, 2010, 3 Pages.
U.S. Appl. No. 12/753,801: Applicant Response to Pre-Exam Formalities Notice, dated Jun. 23, 2010, 8 Pages.
U.S. Appl. No. 12/753,801: Transmittal Letter, dated Aug. 6, 2010, 3 Pages.
U.S. Appl. No. 12/753,801: Transmittal Letter, dated Aug. 11, 2010, 4 Pages.
U.S. Appl. No. 12/753,801: Preliminary Amendment, dated May 18, 2011, 7 Pages.
U.S. Appl. No. 12/753,801: Notice of Publication, dated Oct. 6, 2011, 1 Page.
U.S. Appl. No. 12/753,801: Non-Final Office Action, dated Jan. 23, 2012, 8 Pages.
U.S. Appl. No. 12/753,801: Non-Final Office Action Response, dated Apr. 23, 2012, 14 Pages.
U.S. Appl. No. 12/753,801: Final Office Action, dated Jul. 5, 2012, 9 Pages.
U.S. Appl. No. 12/753,801: Final Office Action Response, dated Sep. 11, 2012, 9 Pages.
U.S. Appl. No. 12/753,801: Advisory Action 9PTOL-303), dated Sep. 21, 2012, 3 Pages.
U.S. Appl. No. 12/753,801: Notice of Appeal as Filed on Oct. 1, 2012, 1 Pages.
U.S. Appl. No. 12/753,801: Request for Continued Examination (RCE), dated Oct. 4, 2012, 26 Pages.
U.S. Appl. No. 12/753,801: Notice of Allowance and Fees Due (PTOL-85), dated Feb. 27, 2014, 8 Pages.
U.S. Appl. No. 12/753,801: Amendment after Notice of Allowance, Filed May 27, 2014, 12 pages.
U.S. Appl. No. 12/753,801: Issue Fee Payment, dated May 27, 2014, 1 page.
U.S. Appl. No. 12/753,801: Response to Amendment, dated May 27, 2014, 1 page.
U.S. Appl. No. 12/753,801: Non-Final Rejection, dated Sep. 22, 2014, 9 pages.
Rempala, et al, "Modeling Hidden Exposures in Claim Severity Via the EM Algorithm," North American Actuarial Journal, vol. 9, No. 2, 2005, pp. 108-128.
Rempala, et al, "Modeling Hidden Exposures in Claim Severity Via the EM Algorithm," Googled the Title for PDF Document, Version 3.0m Jan. 22, 2003, 43 Pages.
Pakhomov, et al., "A Approach to Determining Modification of Clinical Diagnoses," AMIA Annual Symposium Proc. 2006, 609-613, 8 Pages.
Billing Intelligence Website, "Level Your Playing Field," http://www.billingintel.com/medical-billing-emr-rated-best-technology.html, 2008, 2 pages.
Bertsimas, et al, "Algorithmic Prediction of Health Care Costs and Discovery of Medical Knowledge," Operations Research, vol. 56, No. 6, Published Nov. 12, 2008, 50 Pages.
Kamm, "Bagging for One-Class learning," Stanford.edu, Dec. 13, 2008, 5 Pages.
Artiklar et al, "Local Voting Networks for Human Face Recognition," neural Networks, vol. 14, Issue 9, Nov. 2001, 6 Pages.
Website Neuro Gest, "Stock Market Analysis and Prediction using Artificial Neural Networks and Machine Learning Techniques," Neurogest.com, 2002, 4 Pages.
Fumera, et al, "Error Rejection in Linearly Combined Multiple Classifiers," Multiple Classifier Systems, vol. 2096, 2001, 10 Pages.
Chang, "Boosting SVM Classifiers with Logistic Regression," Meta-Learning for Imbalanced Data and Classification Ensemble in Binary Classification, Neurocomputing, 73,484-494, 2003, 16 Pages.
"34 Projects tagged 'Linux'", Geeknet, Inc., 2009, 8 pages.
Chin, "Pairwise Coupling and Pairwise with majority Voting," http://mi.eng.cam.ac.uk/~kkc21/thesis_main/node25.html, Sep. 10, 1998, 5 Pages.
Ruta, et al, "Analysis of the Correlation Between Majority Voting Error and the Diversity Measures in Multiple Classifier Systems," In Proceedings of the 4$^{th}$ International Symposium on Soft Computing, SOCO'2001, Paisley, UK, 2001, 7 pages.
Loo, et al, "Accurate and Reliable Diagnosis and Classification Using Probabilistic Ensemble Simplified Fuzzy ARTMAP," IEEE Transactions on Knowledge and Data Engineering, vol. 17, No. 11, Nov. 2005, 5 Pages.
Ethem Alpaydin, "Multiple Neural Networks and Weighted Voting," Pattern Recognition, 1992, vol. II Conference B: Pattern Recognition methodology and Systems, Proceedings, 11$^{th}$ IAPR International Conference, Aug. 30-Sep. 3, 1992, pp. 29-32.
Verikas, et al, "Fuzzy Measures in Neural Networks Fusion," published before Apr. 2, 2009, 6 Pages.
Fan et al. / "LIBLINEAR: A Library for Large Linear Classification", Journal of Machine Learning Research 9, 2008, pp. 1871-1874 and Acknowledgements pp. 1-17.
Boser et al. / "A Training Algorithm for Optimal Margin Classifiers", D. Haussler, editor, 5$^{th}$ Annual ACM Workshop on COLT, pp. 144-152, Pittsburgh, PA: ACM Press, 1992.
Phua, et al. / "A Comprehensive Survey of Data Mining-based Fraud Detection Research", Artificial Intelligence Review, 2005, pp. 1-14.
Hussain / "Methods of Combining Neural Networks and Genetic Algorithms", Tutorial Presentation, 1997 ITRC/TRIO Researcher Retreat, May 6-8 Kingston, Ontario, pp. 1-3.
Lim et al. / "Application of an Adaptive Neural Network to Medical Decision Support", International Journal of the Computer, The Internet and Management, vol. 7, No. 1, Jan.-Apr. 1999, pp. 1-12.
Chen, et al. / "Improving the Performance of 1D Object Classification by Using the Electoral College", Knowledge and Information Systems, 2006, pp. 41-56.
Huang et al, / "A Comparison of Classification methods for Predicting Chronic Fatigue Syndrome Based on Genetic Data", Journal of Translational Medicine, 7:81, 2009, pp. 1-6.
Joachims / "Learning to Classify Text Using Support Vector Machines, Methods, theory and Algorithms", Pub date Apr. 2002, Springer-Verlad, New York, LLC, pp. 1-2.
Petrakos, et al. / "The Effect of Classifier Agreement on the Accuracy of the Combined Classifier in Decision Level Fusion", IEEE Transactions on Geoscience and Remote Sensing, vol. 39, No. 11, Nov. 2001, pp. 1-8.
Thomas / "Did you Know: Certified RN-Coders are Among the Brightest and the Best at ICD9/HCC Chart Reviews!", www.RN-Coder.com/HCC, 2005, pp. 1-4.
Lita, et al., / "Large Scale Diagnostic Code Classification for medical Patient Records", International Joint Conference on Natural Language Processing, IJCNLP 2008, pp. 1-6.
U.S. Appl. No. 12/753,801: Final Rejection, dated Sep. 29, 2016, 18 pages.

(56) References Cited

OTHER PUBLICATIONS

U.S. Appl. No. 12/753,801: After Final Consideration Program Request, dated Dec. 28, 2016, 57 pages.

* cited by examiner

FIG. 7

710 — Breez Bill Entry
720 — Welcome | New Bill | Edit Bill | View Bill | Void Bill | Refresh
        Bill Entry    730        740       750       760

FIG. 6

610 — Logon

WebEntry Portal
1.3.0.9

Login Name          Password
  620                 630

☐ Change Password    Ok    Cancel

FIG. 8

810 — New Bill

Customer — 820
Test-Demo

Site — 830
Test-Demo

State — 840    Bill Type — 850
CA             OPH

860 — Ok       Cancel

Generalized Training Page

Trying to predict: [ Adjudication Type ⇅ ]

Using bills: [ bill_set1 ⇅ ]

Using features:

- Bill price ( ☑ Float ☐ Integer ☐ String )
- Bill origin ( ☐ Float ☐ Integer ☑ String )
( + Add new feature dimension )

FIG. 12

Make models

| sample (310 bills) ⇅ | training set bill label |
| 1950 | start year |
| 2020 | end year |
| 206 | sample size (number of bills to draw from this set) |
| 137 | bills per model |
| 5 | model count |
| my_awesome_model | new model label |

( Make new models )

FIG. 13

Test models

| my_awesome_model ⇅ | model you'd like to use |
| sample (310 bills) ⇅ | bill label (on which to test) |
| 1950 | start year |
| 2020 | end year |
| 0.95 | threshold (between 0 and 1) |
| 100 | maximum number of bills to test on |

( Test models )

FIG. 14

METHOD OF CLASSIFYING A BILL

FIELD

Claimed subject matter is related to techniques or approaches for classifying one or more bills.

BACKGROUND

Auditing of bills for quality control may take place so that charges are appropriate or so that fraud may be reduced. As an example, in an area such as medical billing, it may be typical for insurance companies to audit bills received from medical providers or facilities in an attempt to verify that services provided have been properly billed as was agreed upon or in accordance with established rules for billing. Typically, auditing of bills is a labor intensive process because it currently is typically performed by human beings due at least in part to complexity associated with billing audits. It would be desirable if at least some portion of bill auditing could be performed using a computing device of some sort, such as a computer. However, issues, such as complexity, speed, accuracy or scalability, have made doing so a challenge.

BRIEF DESCRIPTION OF THE DRAWINGS

Non-limiting or non-exhaustive embodiments will be described with reference to the following figures, wherein like reference numerals refer to like parts throughout the various figures unless otherwise specified.

FIGS. 6-14 are screen shots illustrating a graphical user interface for an embodiment of a bill classifier or bill classification engine.

DETAILED DESCRIPTION

Figure 1:
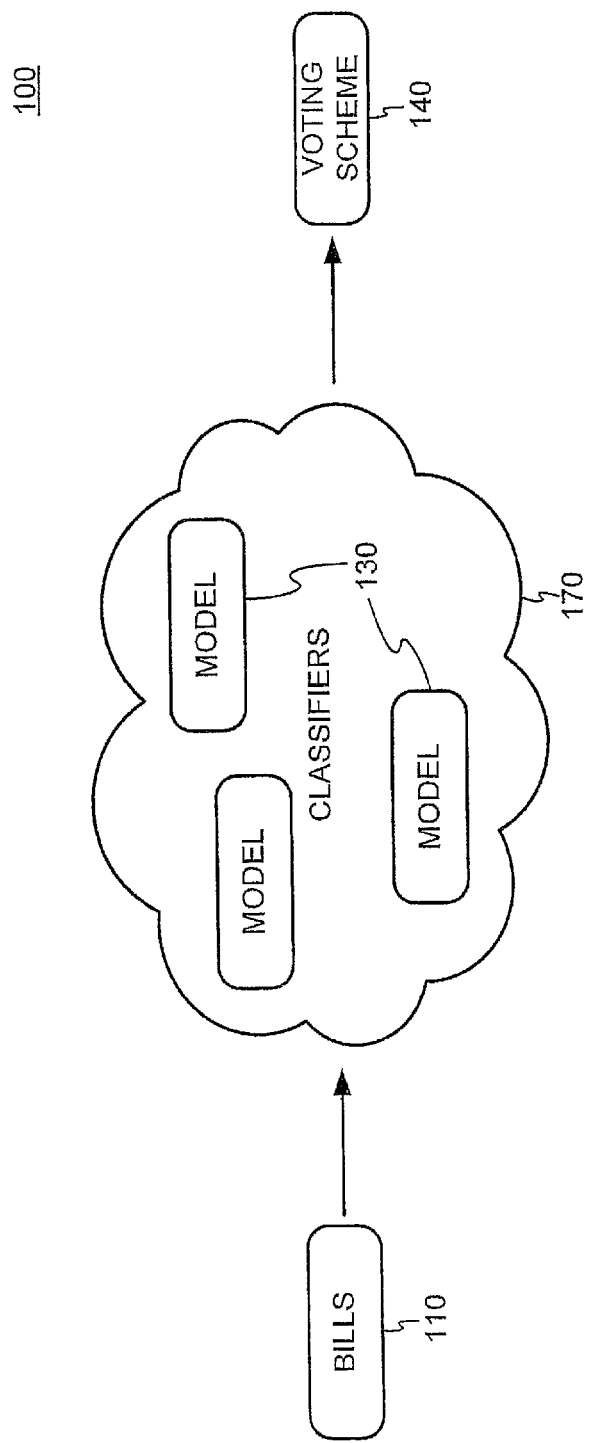
FIG. 1 is a schematic diagram of an embodiment of a bill classifier or bill classification engine at a high level.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter. While subject matter described below is illustrated through application to classification of medical bills, claimed subject matter is not so limited. It is intended that embodiments of a method of classifying a bill in accordance with claimed subject matter may be applied to bills other than medical bills.

Reference throughout this specification to "one embodiment" or "an embodiment" means that a particular feature, structure, or characteristic described in connection with an embodiment is included in at least one embodiment of claimed subject matter. Thus, appearances of the phrase "in one embodiment" or "an embodiment" in various places throughout this specification are not necessarily all referring to the same embodiment. Furthermore, particular features, structures, or characteristics may be combined in one or more embodiments.

Some portions of the detailed description which follow are presented in terms of algorithms or symbolic representations of operations on binary digital signals stored within a memory of a specific apparatus or special purpose computing device or platform.

In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, quantities may take the form of electrical or magnetic signals capable of being stored, transferred, combined, compared or otherwise manipulated. It has proven convenient at times, principally for reasons of common usage, to refer to signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of a special purpose computer or similar special purpose electronic computing device.

As discussed previously, bill processing or auditing is typically a labor intensive process. Again, in this context, an embodiment shall be described with reference to application to medical bills, although claimed subject matter is not limited in scope in this respect. Typically, in a medical bill auditing context, an insurer or other third party may attempt to audit or review bills for payment. It may be desirable to have the ability to classify bills to audit or process them appropriately. This may be true regardless of whether processing is performed by a human being or a computing device. However, having the ability to classify a bill using a special purpose computing device or similar computing platform may be a desirable goal to reduce labor costs associated with auditing or processing bills, for example.

Bills may typically come to an insurer or other bill review company in a variety of forms, including in a disorganized fashion. Bills may, for example, arrive as paper documents, in which case, it may be desirable to code information contained within bills as received. Alternatively, bills may arrive in electronic form. Even if received in electronic form, bills may contain a variety of errors. Therefore, it may be desirable to process bills to identify, and perhaps, adjust possible errors. Mistakes due at least in part to human error, for example, may be made in completing a bill or in coding a bill. Likewise, an initial bill itself may, in some fashion, be incorrect. For example, a bill may be subject to abuse or fraud; however, other types of errors may also be possible.

For example, as is discussed in more detail below, a service may be charged which was not capable of being delivered by an organization producing a bill for payment. Errors capable of being identified and, if desired, adjusted from the face of a bill itself with knowledge of established or accepted billing processes or procedures shall be referred to as apparent errors. All other types of errors that may occur shall be referred to as latent errors. Examples of apparent errors may include inconsistencies within a bill or an aspect of a bill that are not consistent with agreed upon or established billing processes or procedures. For example, as alluded to above, if an emergency room bills for a service that an emergency room is not capable of providing, this would be an example of an apparent error. This example error is capable of being detected through examination of the emergency room bill alone. Other types of errors may not be capable of being detected by examining a bill. Those errors may be handled in another fashion.

Scope of claimed subject matter is not intended to be limited to a list of ways in which bills may be classified. A tremendous variety of possible bill classifications are possible. Claimed subject matter is intended to cover any and all varieties of bill classification. Solely for purposes of illustration, without limitation, several examples shall be discussed. For example, one type of classification may relate to point of origin of a bill, as alluded to previously. Likewise, another type of classification may relate to facility or adjudication type for a bill. Still another classification may relate to type of service being billed. Yet another classification may comprise bills that are potentially a result of billing abuse or billing fraud. Again, these are intended merely as examples and do not in any way limit claimed subject matter scope.

Point of origin or a location from which a bill originated may comprise a desirable bill classification that may be used to determine at least in part subsequent processing for a bill, for example. Hence, having an ability to classify bills along this parameter via application of a computing device, such as a special purpose computing device, for example, may be desirable. It is believed a robust or universal standard or system for categorizing or tagging bills by point of origin does not currently exist. This is consistent with the previous observation that bill auditing or sorting tends to be labor intensive. Therefore, being able to classify a bill based, at least in part, on origin may provide downstream advantages. For example, as suggested previously, a bill's location of origin may dictate appropriate bill pricing. For example, different places of origin or adjudication types may, in various states, be governed by a variety of laws which determine acceptable charges. Therefore, identifying adjudication type or bill origin may assist in assessing which charges may be legitimate versus which ones may not be legitimate.

Table 1 below provides a list of possible adjudication types. Of course, claimed subject matter is not limited in scope to these adjudication types. These adjudication types are intended to be merely one example of typical adjudication types. Table 1 is provided merely for illustration purposes. In this context, the term "adjudication type" refers to a bill that originated from a particular point of origin.

TABLE 1

Table of Adjudication Types

| Adjudication Type | Short Description |
| --- | --- |
| AMB | Ambulances or other medical transport |
| ASC | Ambulatory Surgical Center—Surgeon's office |
| DME | Durable Medical Equipment suppliers |
| ER | Emergency Room |
| IPH | Inpatient Hospitals |
| OPH | Outpatient Hospitals —Hospital visit w/o room charge or overnight stay |
| PRO | Professional Bills—Those are bills originating from doctors office visits |

A longer list of adjudication types is provided at the end of the specification; however, again, claim scope is not limited to these examples, which are provided for purposes of illustration only.

A complex legal framework typically surrounds payment of medical bills. Aspects of it, for example, may vary at least in part depending on conditions under which a medical service or procedure may have taken place. If one is to re-price a bill using a fee schedule, classification of point of origin may be desirable since for different points of origin different rates may apply or be mandated by state or federal law. Likewise, if one desires to re-price a bill in accordance with usual, customary or reasonable charges, a comparison or averaging of pricing for a particular adjudication type may be desirable. For example, it would not seem logical or appropriate to pay an in-patient hospital bill in accordance with emergency room service rates. After bills have been properly classified, such as in accordance with point of origin, it may be easier to efficiently or consistently detect errors, abuse, or fraud.

Determining point of origin of a bill is not simply a matter of searching for a service code on a bill, however. There are a number of reasons for this. For example, different facility types may use different billing forms. Likewise, type of form may narrow down possibilities for classification, but typically may not provide a conclusive answer. Likewise, an initial bill or form may not always be included with bill information that may be received. Further, in a circumstance in which there may be a risk of billing abuse or fraud, it is desirable to not rely exclusively upon what a particular billing form may indicate.

Despite desirability of being able to determine a point of origin of a bill, doing so is not straightforward. For example, different points of origin or adjudication types may overlap in terms of services that may be provided or how services may be charged, making identifying point of origin based only upon provided billing information more challenging. Likewise, again, if risk exists that origin of a bill may be masqueraded for fraud or abuse, for example, some approach for being able to uncover an accurate indication of origin or source of a bill is desirable.

In one embodiment, a rule-based system for classifying medical bills may be employed. For example, one may apply deterministic rules providing cross-checks of billing information, such as whether a particular adjudication type provides a particular service or whether it complies with certain fee schedules, as examples. Deterministic or rule-based approaches are known. However, a disadvantage of an approach that is exclusively deterministic or rule-based is that it typically does not provide sufficient levels of confidence to be satisfactory. A rule-based or deterministic approach may classify a high percentage of bills; however, not a sufficiently high percentage of bills to be satisfactory for commercial purposes. For commercial purposes, a percentage as high as well over 90%, and even as high as 95% or better, may be desirable. One reason that high percentages are desirable is because there are many bills to be classified. Therefore, even 80% classification accuracy would suggest relatively high labor costs to classify the remaining 20% or so.

For example, in production, it may be desirable for a classification engine to be able to rapidly and accurately classify hundreds of thousands to millions of bill in an hour or two. Likewise, it is desirable that classifications be performed with a degree of confidence so that human auditors' time is conserved. This may be desirable for processing of bills efficiently and for an embodiment which may include active learning. Active learning is discussed in more detail later in this detailed description In accordance with claimed subject matter, in at least one embodiment, a decision process that is at least partially based on one or more statistical processes may be applied to raise classification accuracy. For example, for a decision process, such as choosing between at least two alternative paths or courses of action, one or more statistical methods may be employed to aid in making a decision or choice between alternatives. In this context, this is referred to as a statistical based decision process. One example, without limitation, includes a decision to classify a bill into a first category or a second category. Examples of statistical methods that may be employed in a statistical based decision process include, without limitation, Naïve Bayesian processes or methods, machine learning processes, feature recognition processes, as well as others mentioned in more detail later.

For example, in an example embodiment, but without intending to limit the scope of claimed subject matter, a bill may be classified applying multiple bill classification schemes in which at least some bill classification schemes are derived using one or more statistical based decision processes, as described in more detail below.

Benefits of employing a decision process that is statistical based, rather than one that is exclusively deterministic or rule-based, as described above, include the following. A wider range of adjudication types may be differentiated. More bills may be capable of being processed. Results accuracy may be improved overall. In addition, speed may be increased, as shall be described in more detail below. For example, support vector machine learning, or an SVM-type process, is known to be a rapid computational technique for processing large amounts of information quickly via a computer or similar computing device. In this context, the term SVM-type process refers to one or more processes that would be recognized or understood as being at least partially related to SVM or support vector machine learning. Likewise, the terms SVM, support vector machine learning, SVM-type process, or the like are used interchangeably throughout this application to indicate that these terms are intended to be construed broadly and consistently throughout.

A factor to consider if employing a statistical based decision process may include a potential impact of a false negative or a false positive. Typically, if applying a statistical process or method, a trade-off may exist between reducing the occurrence of one versus reducing the occurrence of the other. In any particular environment, this may be addressed by considering whether false positives may be more undesirable than false negatives or vice-versa. For example, in a given situation, it may be possible to put a bill on hold rather than classify it improperly. This may be employed, for example, for situations in which a bill is recognized or considered to be ambiguous based at least in part on application of a particular bill classification scheme or approach in accordance with claimed subject matter. An issue with having false positive, as an example, may be is that a bill may be paid and it may later be difficult to collect back money that was improperly paid. In contrast, for a false negative, for example, a bill may be put on hold as a result and, therefore, the aspect mentioned regarding repayment may be satisfactorily addressed. Likewise, another similar potential issue associated with false positives relates to employing a sound consistent re-pricing methodology across groups of bills to reduce risk of legal challenge.

In a situation in which a bill is determined or considered to be ambiguous, it may be identified as a difficult to classify bill. Perhaps a human auditor may be able to appropriately classify a particular bill. If so, it may be appropriate or desirable to replace the bill into the system to provide additional data that may be employed for training to identify difficult-to-classify bills. However, if a human auditor finds the bill to be genuinely ambiguous instead it may be desirable to discard it.

In another potential embodiment, an approach may be to add a classification for ambiguous bills in addition to other classifications in a particular classification scheme, although claimed subject matter is not limited in scope in this respect. For example, in a classification scheme in which point of origin is a desired classification, in addition to classifications indicated in Table 1, an additional classification indicating that a bill is ambiguous may be added. As indicated, after ambiguous bills are identified, a human auditor may appropriately determine a possible reason for bill classification ambiguity. Again, however, it is desirable, due at least in part to considerations, such as volume, speed, as well as cost, that a relatively small percentage of bills fall into this category, such as on the order of below 10%, or perhaps below 5%, in some embodiments.

Another advantage of a statistical based decision process over an exclusively deterministic approach is a capability for gradual improvement or "learning" over time, referred to in this context as active learning. For example, evolving coding standards or the like may be appropriately accommodated with application of statistical methods if shifts are reasonably gradual. Modeling or training, as described in more detail later, may appropriately take into account gradual shifts.

FIG. 1 is a schematic diagram illustrating one embodiment of a classification engine, although claimed subject matter is not limited in scope to the embodiment shown in FIG. 1. In this context, the terra classification engine refers to a special purpose computing device or the like programmed to be capable to determine classification of a bill using statistical based decision processes.

At a high level, for at least one embodiment 100, bills 110 may be applied to multiple bill classification schemes 130. Again, as previously described, bill classification schemes may be derived from one or more statistical based decision processes, as described in more detail below. Likewise, after application of multiple bill classification schemes 130 to a particular bill, for example, multiple outcomes of application of multiple billing classification schemes 130 to a bill may be employed in a voting process or scheme 140 to determine an assigned bill classification for the particular bill.

However, we note that adding a voting process or scheme while employed to improve accuracy may also add complexity. One disadvantage of additional computational complexity is that it may increase the amount of time it may take for bill processing. Therefore, improved accuracy, while desirable, may in some embodiments affect throughput or speed of bill processing. On the other hand, degraded accuracy may also slow down bill processing through use of human auditors to address inaccuracies, for example.

It is desirable if bills provided to a bill classifier or bill classification engine are substantially, if not completely, free of coding or other similar types of more common apparent errors. However, a variety of approaches may be employed to verify integrity of billing information being applied to a bill classification engine. For example, cross checks of information in a bill, such as billing services, point of origin or the like, may be evaluated for inconsistency. In cases where consistency is not present within the four corners of bill information available, so to speak, this may identify a coding or similar error. A bill may, likewise, be processed for adjustment. As one simple example solely for purposes of illustration, if a medical billing code is stored using Excel® software, available from Microsoft, leading zeros that are part of the billing code may be removed by the program; however, removing leading zeros may produce an invalid medical billing code in some situations. One approach in a system for reducing coding errors may be to apply a consistent or standardized nomenclature across a variety of bills for corresponding portions of a bill, although claimed subject matter is not limited in scope in this respect. Identification or identification and adjustment of coding errors, for example, is believed to be possible to implement using state of the art approaches.

Figure 2:
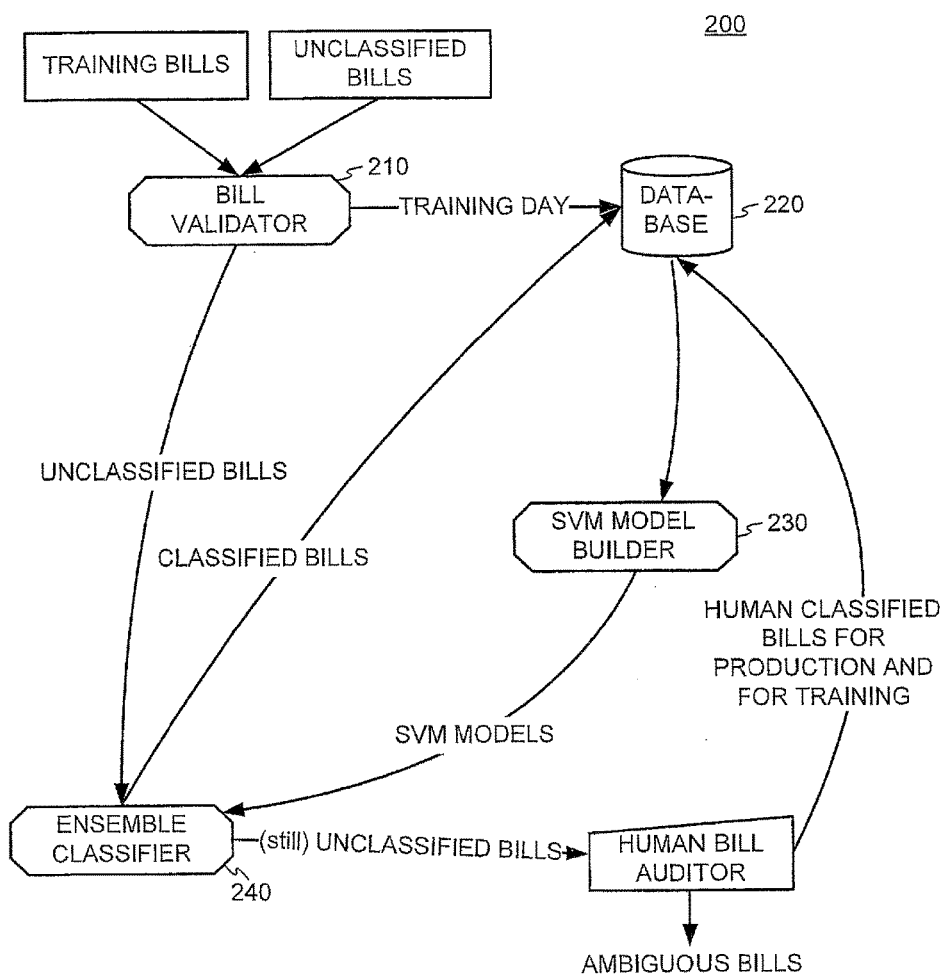
FIG. 2 is a schematic diagram of the embodiment of FIG. 1 showing more detail.

FIG. 2 is a schematic diagram illustrating, at a more granular level, an embodiment of a bill classifier or bill classification engine. Although, again, claimed subject matter is not limited in scope to this particular embodiment. As illustrated in FIG. 2, training bills may be run through a bill validator 210, which may insert bills deemed valid into a database 220. However, these bills may be employed subsequently if a model builder, illustrated in FIG. 2 as 230, is initialized with a request for a model derived from N bills, where N comprises an integer numeral. Claimed subject matter is not limit in scope in this respect; however, if a set of X training bills is available, X being an integer numeral, for example, then for at least one embodiment, a random set of N bills may be selected from X, where N is (⅔)X. N may be truncated or rounded if X is not evenly divisible by 3 in this example. Of course, this is simply one example and claimed subject matter is not limited to the particular details of this approach. Nonetheless, this may be done multiple times with a set of X training bills to create heterogeneous sets of bills for training reasons, as described in more detail below.

Figure 3:
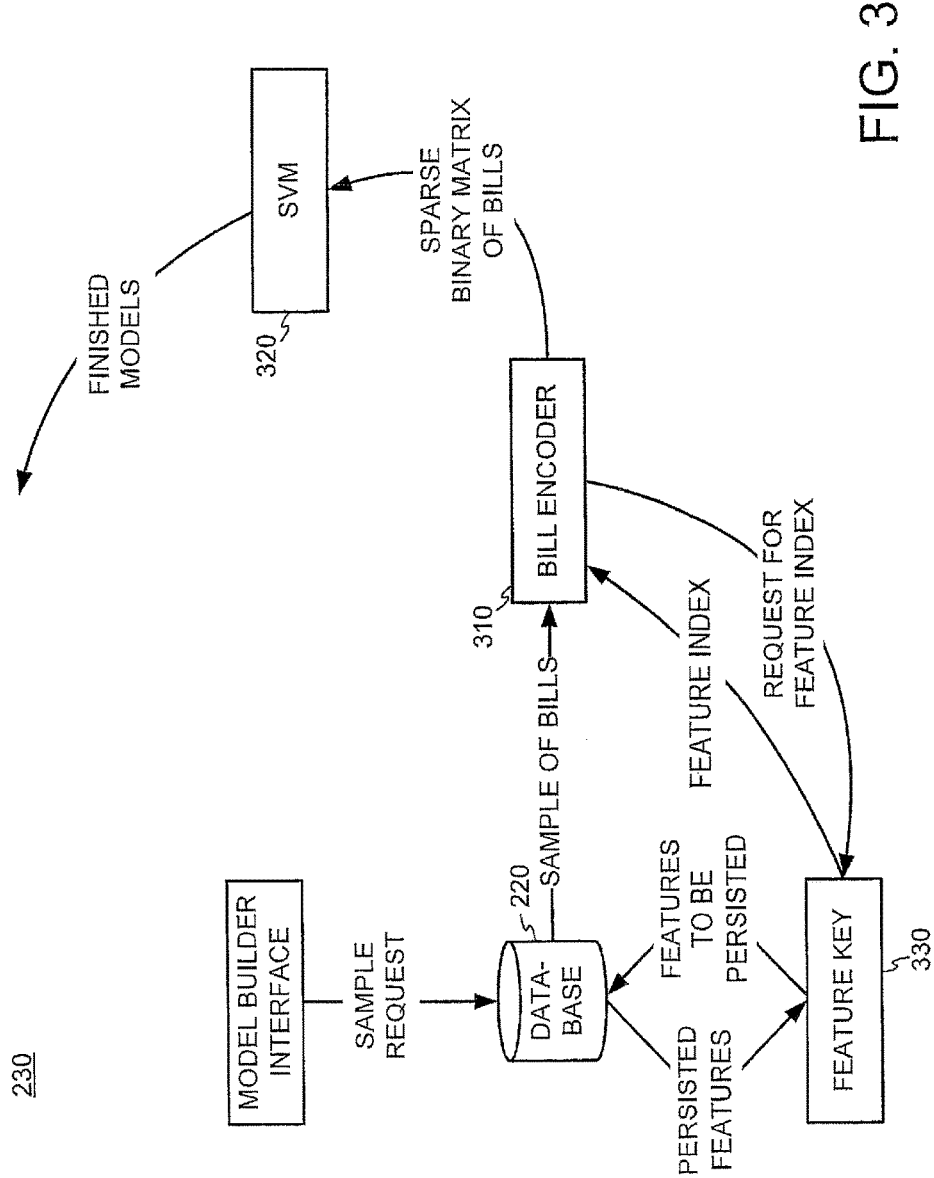
FIG. 3 is a schematic diagram of an embodiment of a model builder for the embodiment of a bill classification engine or bill classifier of FIG. 1.

FIG. 3 is a schematic diagram illustrating model builder 230 in greater detail. Model builder 230 may request N bill samples from database 220. Bill samples may be fed into bill encoder 310 before being input into a model generator 320. Although claimed subject matter is not limited in scope in this respect, in at least one embodiment, model generator 320 may comprise an SVM or SVM-type model generator.

An aspect of training for model generation in at least one embodiment may involve arranging bills in selected classifications and using bills for a particular classification as training bills for a machine learning process, as an example. This may allow a classification engine to detect latent relationships within a classification between already classified bills, for example. For example, a set of training bills where abuse or fraud is believed to be detected may be employed for model generation in an embodiment, if desired. Likewise, in an alternate embodiment, as alluded to above, a subset of bills may be randomly selected from a training set. As discussed in more detail later, this may permit disagreement to be created among models generated using heterogeneous sets of bills.

In at least one embodiment, SVM-type model generator 320 may provide n models for voting or for an ensemble process, where n comprises an integer numeral. Generation of n models is described in more detail below. Bill encoder 310 may track a mapping between bill features and integer numerals, for example, although, again, claimed subject matter is not limited to this approach. One benefit, however, is that a particular feature mapping may be employed consistently across a set of bills. Likewise, bill encoder 310 may transform bill objects into a row or column in a sparse matrix that may be employed by SVM-type model generator 320. In an SVM-type process, for example, a sparse matrix may be employed in connection with mathematically generating a classification engine. A feature index for bill encoder 310 may be produced by feature key 330 for the embodiment shown in FIG. 3, for example. In at least one embodiment, for example, a feature index may assign particular features to particular positions in a row or column of a sparse matrix with an entry for a particular feature indicating how often the feature may be detected to have occurred for a set of bills. Of course, claimed subject matter is not limited in scope to this approach or embodiment. This example is provided solely for illustration purposes.

Figure 4:
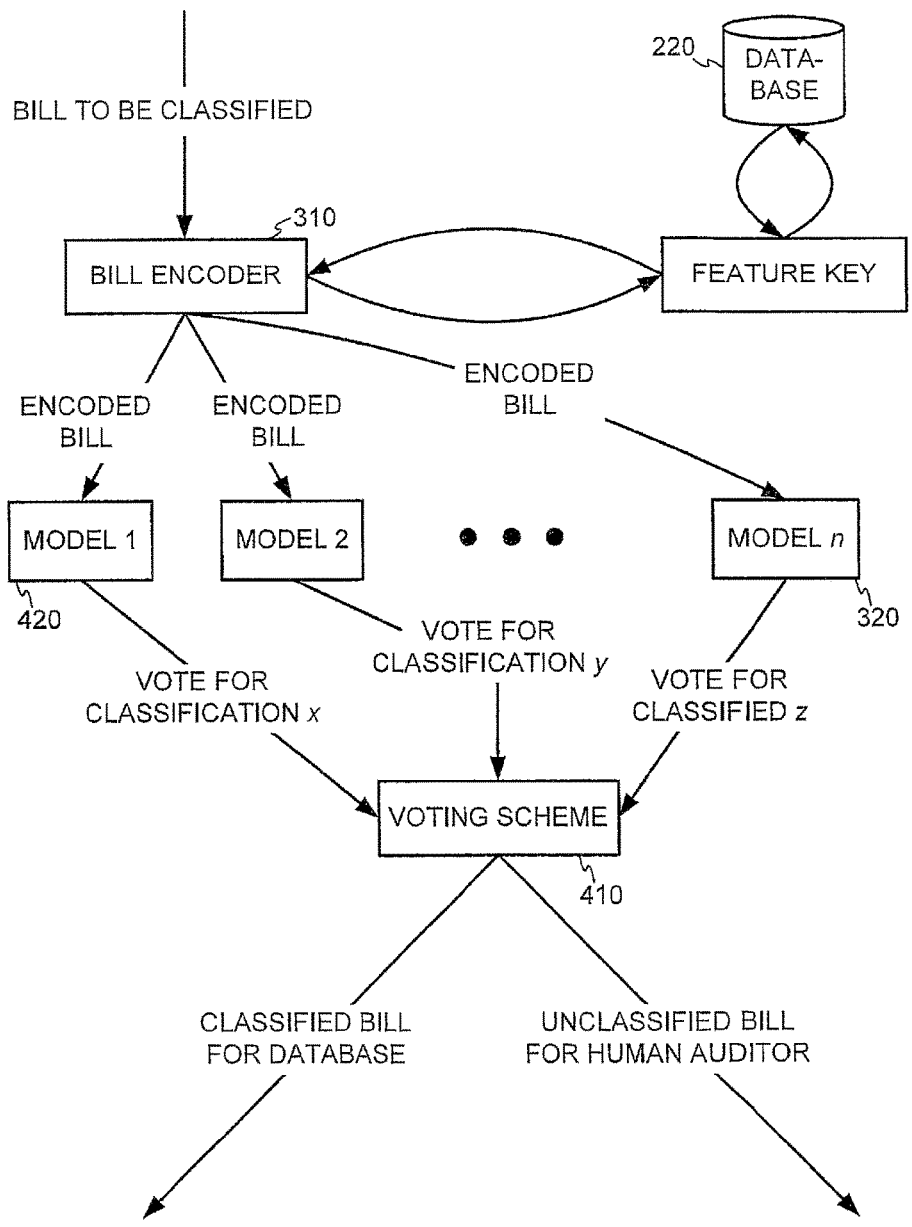
FIG. 4 is a schematic diagram showing an alternate representation of the embodiment of FIG. 1.

Returning to FIG. 2, and then moving to FIG. 4, a more detailed illustration of the embodiment of FIG. 2 is provided. FIG. 4 includes bill encoder 310, database 220, features key 330, and also illustrates n models, which may be produced by SVM or SVM-type model builder 230. Likewise, ensemble classifier 240 of FIG. 2 is illustrated in FIG. 4 as voting scheme 410.

For example, in an embodiment, two types of bills may be entered into a bill classifier or bill classification engine. Bills that have been assigned an adjudication type with an acceptable degree of accuracy for training or bills that have not. Bills of the former type may be referenced as training bills in a particular embodiment. Bills of the latter type may be referenced as classification bills in a particular embodiment. It is noted that bills for training may typically be produced by human auditors initially.

As described previously, training bills are run through a bill validator; however, classification bills may also be run through a bill validator. However, after being run through a bill validator, classification bills may be sent to ensemble classifier 240, which may comprise an ensemble of SVM-type models, rather than being inserted in database 220. Ensemble classifier 240 may run classification bills through bill encoder 310. Bill encoder 310 may produce sparse binary arrays that may be used or applied to n models 420, illustrated in FIG. 4, constructed by model builder 230. A model may produce an outcome of a classification for a particular bill, in this particular example, an adjudication type.

As alluded to previously, disagreement may occur from sampling randomly with a large pool of bills. Disagreement may be desirable so that robust patterns that may occur in a majority of bills are represented in many or a majority of generated models while unlikely or occasional results may show up in a small number of generated models. However, as explained previously, added complexity may increase processing time or reduce processing throughput. Nonetheless, it may be beneficial in at least some situations to consider whether or not to make a trade off between accuracy and bill processing time.

Voting may be employed by ensemble classifier 240 using multiple outcomes, such as by applying voting scheme 410 of FIG. 4. For example, in at least one embodiment, a majority vote may assign a bill a particular classification, or else a bill may be sent to a human auditor. Bills that are appropriately classified may be inserted into database 220. Bills that are unable to be classified using ensemble classifier 240 may be manually classified using a human auditor. If bills classified by a human auditor are able to be classified appropriately, those bills may be employed in generation of subsequent models. Therefore, another aspect of an embodiment in accordance with claimed subject matter may involve model retraining. If a human auditor cannot classify a bill; however, it may be considered genuinely ambiguous and may be omitted.

In another embodiment, a confidence rating may also be generated along with a classification. Likewise, for still another embodiment, instead of employing voting or majority vote to determine classification, a threshold level may be employed and bills that achieve or exceed a threshold level, for example, may be classified and those that do not may be assigned to a human auditor for further review. Likewise, threshold levels may be adjusted or varied in a variety of circumstances, such as reflecting information about the bills involved, passage of time, etc.

Likewise, in another embodiment, backtracking and adjustment of errors may be employed to accomplish quality control. In at least one embodiment, if billing information were to be changed in any way, circumstances of the change may be tracked, such as, for example, who or what made the particular change, what the particular change was, and the time within the process at which the particular change was made. If, therefore, it were later discovered that the particular change should not have been made for one reason or another, the capability exists to back-track to the point at which the particular change occurred and accordingly undo downstream consequential modifications which may have resulted from the particular change that was later determined to be ill-advised. Of course, again, claimed subject matter is not limited in scope in this respect.

Application of an embodiment to medical bills may produce a feature set, such as illustrated in Table 2 below.

TABLE 2

Feature Set

| Feature | Descriptions |
| --- | --- |
| TIN | Tax Identification Number for the facility or doctors office |
| Diagnosis Codes | ICD-9 Diagnosis codes |
| Date range | The Number of days between the first and last day of service |
| Number of Days | The number of unique days on which a service is billed |
| Number of line items | The number of charges on a bill |
| Procedures | HCPC, CPT, ICD-9 Procedure, HRC and NDC codes |

In at least one particular embodiment, for example, six features may be included in a feature set, although, of course, claimed subject matter is not limited in scope in this manner. As previously described, a feature index may be employed by bill encoder 310. Therefore, features in the feature set of Table 2 may be encoded as a dimension in a sparse binary matrix, which then may be applied to SVM-type model builder 230, as previously described.

Support vector machines (SVM), SVM learning, or SVM-type processes refers to a set of related supervised learning methods used for classification and regression. More formally, a support vector machine constructs a hyperplane or set of hyperplanes in a high or infinite dimensional space, which can be used for classification, regression or other tasks. Intuitively, a good separation is achieved by a hyperplane that has the largest distance to the nearest training points of any class since in general the larger the margin the lower the generalization error of a classifier. SVMs or SVM-type processes belong to a family of generalized linear classifiers. They are also known as maximum margin classifiers.

Multiclass SVM aims to assign labels to instances by using support vector machines, where the labels are drawn from a finite set of several elements. A dominating approach for doing so is to reduce a single multiclass problem into multiple binary classification problems. The problems yield a binary classifier, which is assumed to produce an output function that gives relatively large values for examples from a positive class and relatively small values for examples from a negative class. Two common methods to build binary classifiers are where a classifier distinguishes between (i) one of the labels to the rest (one-versus-all) or (ii) between pairs of classes (one-versus-one). Without limitation, embodiments of claimed subject matter are intended to include applications of processes such as the examples provided above.

In a particular embodiment, bagged SVM may be employed. Bagged SVM refers to a particular SVM that involves creating multiple models using a substantially similar process with heterogeneous training sets. Disagreement may be created between various models and a voting scheme may be applied to differentiate between tentative and confident classification decisions. For example, in at least one embodiment, a bagged SVM scheme may employ 200 models built on training sets of 15,000 bills. If 99% of the classifier models agree, a bill may be classified; otherwise, a bill may be put on hold. Testing indicates that an overall accuracy above 97% may be achieved in some instances.

Figure 5:
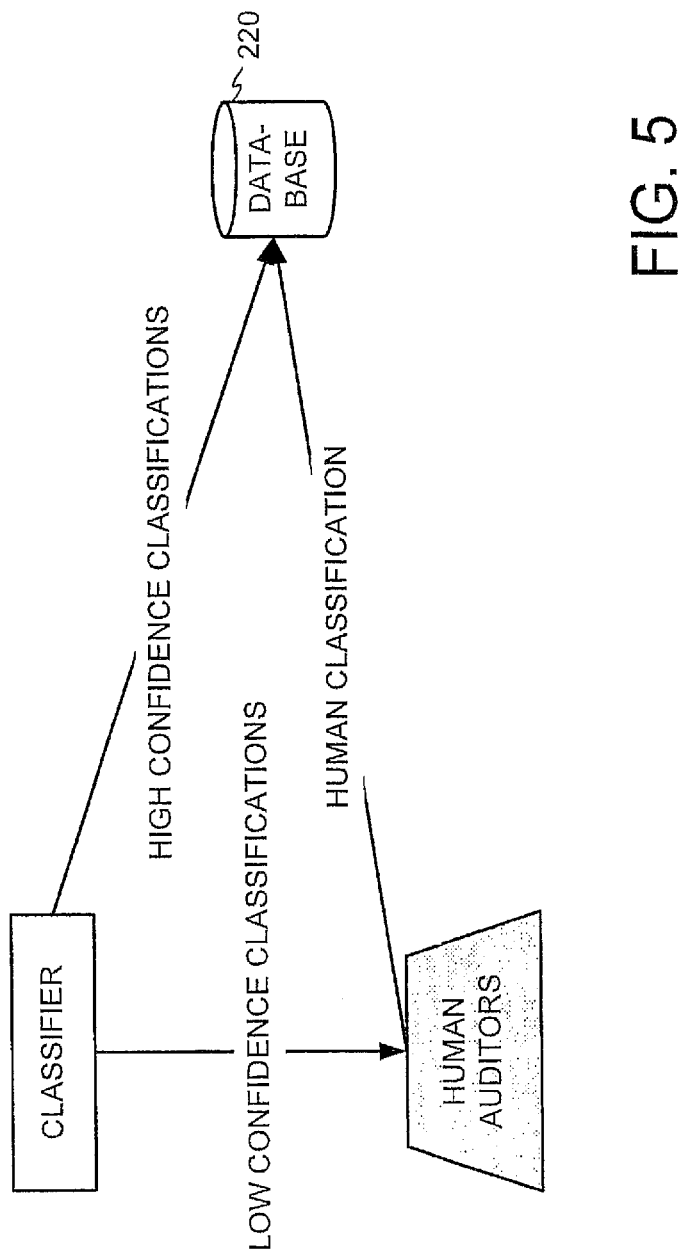
FIG. 5 is a schematic diagram illustrating an aspect of an embodiment of a bill classifier or bill classification engine that is capable of active learning.

FIG. 5 illustrates an embodiment of an active learning component in which bills with low confidence classifications may be sent to human auditors. In an embodiment, if a bill may be adequately classified by a human auditor, it may be added to database 220, as previously described. Otherwise, a bill may be omitted as genuinely ambiguous.

Numerous other classification processes are possible and are intended to be included within the scope of claimed subject matter. For example, a more general system embodiment may employ parameterized requests for a certain number of models using one of a large list of classifiers. Typically or commonly, machine learning processes, for example, employ similar information to produce models, such as variations of matrix formulations. A general system embodiment may, therefore, encompass a variety or range of model types. Likewise, ensemble or voting approaches permit flexibility in combinations of multiple methods of classification. Examples, without limitation, may include the following supervised learning methods: artificial neural networks, including, for example, the perceptron linear classifier or ARTMAP; decision trees, including, for example, C4.5, ID3, CART, or the random forest ensemble of decision trees; k-nearest neighbor, various genetic processes, or winnow processes For example, a decision tree family of learning processes may generate a flow-chart or tree-like structure where a terminal node of a diagram (e.g., a leaf of a tree) may represent a possible classification and a fork may represent a question of whether a bill possesses certain features. Classification of an object may be implemented, for example, by traversing a tree diagram, checking to see which branch corresponds to features possessed by a given object, until a leaf or classification is reached. Of course, this is just merely one of many possible examples and claimed subject matter is not limited in scope to any particular process or approach.

Although claimed subject matter is not limited in scope in this respect, it is noted that in an embodiment, a web entry portal may be employed having a graphical user interface or GUI to enter bill information into a classification system. For example, FIG. 6 illustrates an embodiment of a web entry portal 610 employing a login name 620 and password 630. After being logged in, a client may see a tool bar embodiment 710, such as that illustrated in FIG. 7, listing actions available. As illustrated in FIG. 7, a new bill may be entered into a system via 720. Alternatively, an existing bill previously entered may be edited via 730. A third option is to view a bill in Read-Only mode via 740. A bill may be deleted or voided via 750. Also, a display in a particular session may be refreshed via 750.

To add a new bill into a system, one may select "New Bill" 720 and a small window 810, as illustrated in FIG. 8, may pop up asking a user to select basic information to proceed. For example, a customer field 820 may be populated through a drop-down menu. Likewise, a variety of sites may be populated in a site field 830 and fields 840 and 850 for state and bill type may also be populated. After appropriate pull-down selections have been made, "Okay," indicated by 860, may be selected and a user may be redirected to a new bill page in which additional fields may be further entered, such as illustrated in FIG. 9, for example.

As illustrated, a host of codes and information fields may be provided. For example, a bill tracking number 910 may be assigned to track a bill through a review process. Likewise, fields, such as "Entered By" 920 or "Last Edited" 930 may be provided for auditing purposes. Example fields such as shown in FIG. 9 are generally self-explanatory and claimed subject matter is not limited in scope to the particular fields illustrated or to a particular filed layout of a page. FIG. 9 is merely provided as an example embodiment.

Figure 9:
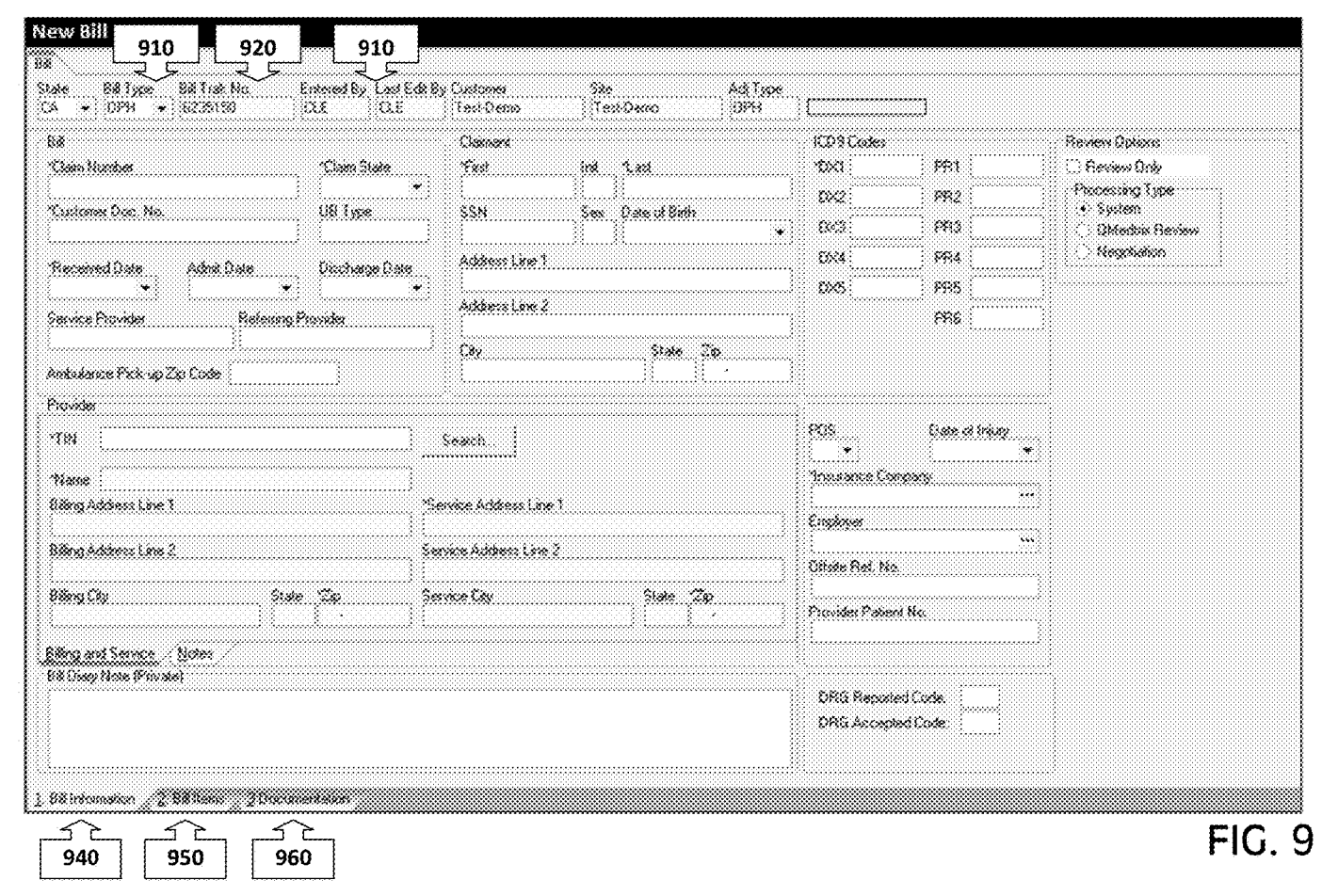
Figure 10:
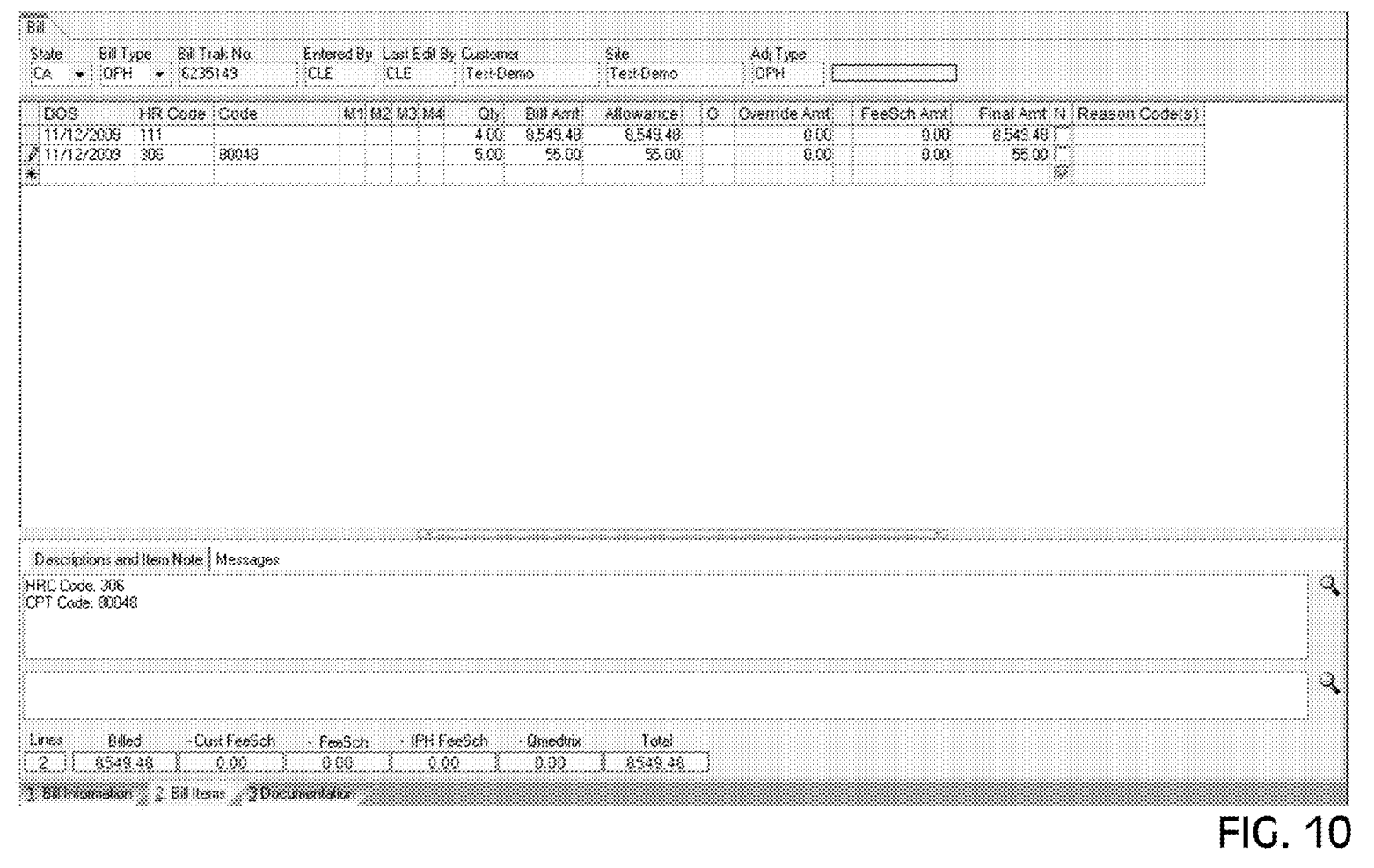
Figure 11:
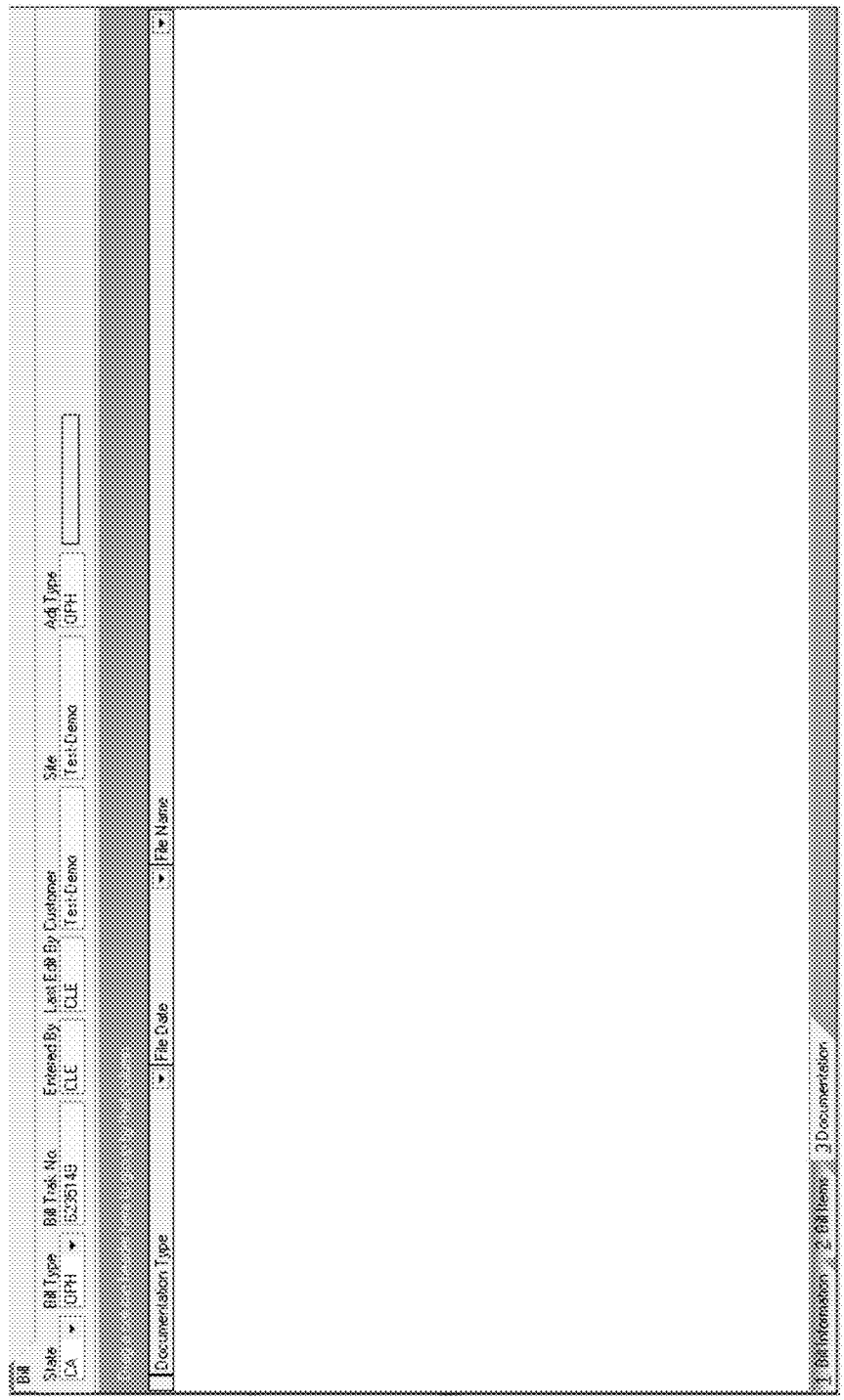

Likewise, as shown by FIG. 9, at the bottom of a screen, three tabs are provided: Bill Information 940, Bill Items 950, and Documentation 960. Bill Items tab 950 is where one would manually enter itemized bill information, such as codes and modifiers, as well as quantity and date of service for individual procedures within a bill. FIG. 10, for example, is a screen shot illustrating itemized bill information displayed after clicking a Bill Items tab and FIG. 11, for example, demonstrates additional documentation pertaining to a bill that may be displayed after clicking on a Documentation tab.

Likewise, FIGS. 12-14 illustrate screen shots that may be employed by a user who desires to execute or run an embodiment of a bill classifier or bill classification engine. For example, an embodiment of a generalized training page is provided in FIG. 12 in which a particular classification is populated in a first field 1210, whereas a storage location of bill information for which training is to be applied is provided in a second field 1220. Also, information type may be specified, as illustrated by 1230 and 1240, or new feature dimension may be added, as illustrated by 1250. Again, this is merely one example embodiment and claimed subject matter us not limited in scope in this respect.

FIGS. 13 and 14 are similar in terms of illustrating fields that may be populated, such as a page for model builder embodiment 230 which may provide a training set bill label field 1310, starting year 1320, ending year 1330, sample size 1340, bills per model 1350, model count 1360, and label for which a generated model is to be assigned 1370. 1380 illustrates a tab which may be clicked by a user to execute or run a model builder embodiment, such as a model builder 230. Likewise, FIG. 14 similarly illustrates an embodiment of a user page that may be employed to test a model produced on sample bills also having a similar set of fields.

Provided below is a list of sample or example adjudication types, including sub-classifications. If used as classifications, these examples are not necessarily intended to be mutually exclusive. Additionally, some may not indicate bill origin, but may instead indicate nature of services provided on a bill.

PROFESSIONAL (PRO)
    anesthesia
    surgery
    radiology
    laboratory
    medicine
    evaluation/mgmt
AMBULANCE (AMB)
SKILLED NURSING FACILITY (SNF)
OUTPATIENT HOSPITAL (OPH)
AMBULATORY SURGERY CENTER (ASC)
    surgery
    ophthalmology
    gastrointestinal/endoscopy
    ESRD/dialysis
INPATIENT HOSPITAL (IPH)
    acute
    rehabilitation
IMPLANTS
HOME HEALTH
HOSPICE
EMERGENCY ROOM (ER)
DRUGS
    prescription/Rx
    over the counter/OTC
DME/HCPCS
    AT-transportation svcs
    AMS-med/surg supplies
    B-enteral/parental Rx
    C-outpatient PPS D-dental
E-durable medical equipment
G-procedures/svcs-temporary
H-alcohol/drug treatment svcs
J-drugs non-oral
K-durable medical equipment-temporary
L-orthotic/prosthetic procedures
M-medical svcs
P-pathology-laboratory
Q-temporary
R-diagnostic radiology svcs
S-temporary
T-national-medicaid
V-vision/hearing It will, of course, also be understood that, although particular embodiments have just been described, claimed subject matter is not limited in scope to a particular embodiment or implementation. For example, one embodiment may be in hardware, such as implemented on a device or combination of devices, as previously described, for example. Likewise, although claimed subject matter is not limited in scope in this respect, one embodiment may comprise one or more articles, such as a storage medium or storage media, for example, that may have stored thereon instructions executable by a specific or special purpose system or apparatus. As one potential example, a specific or special purpose computing platform may include one or more processing units or processors, one or more input/output devices, such as a display, a keyboard or a mouse, or one or more memories, such as static random access memory, dynamic random access memory, flash memory, or a hard drive, although, again, claimed subject matter is not limited in scope to this example.

Although embodiments have been described with reference to accompanying drawings, it is to be noted that various changes or modifications may be accomplished. Changes or modifications, whether apparent to one of ordinary skill in the art or not, are to be understood as being intended to be subject matter within the scope of the claims that follow.

What is claimed is:

1. A method for automated electronic document auditing and analysis to facilitate electronic document classification, the method implemented by one or more computing devices and comprising:
   deriving at least one machine learning bill classification scheme using one or more statistical based decision processes by encoding at least a first set of electronic medical bills to generate at least one sparse binary matrix and generating one or more models using the at least one sparse binary matrix as input to a support vector machine (SVM) process;
   applying to a second set of electronic medical bills the one or more models, wherein at least some of the second set of electronic medical bills comprise different electronic billing forms and the second set of electronic medical bills is different from the first set of electronic medical bills;
   automatically classifying one or more of the second set of electronic medical bills as associated with one of a plurality of adjudication types based on the application of the one or more models to the second set of electronic medical bills; and
   inserting the classified one or more of the second set of electronic medical bills into an electronic database.

2. The method of claim 1, wherein the one of the adjudication types comprises a medical bill origin.

3. The method of claim 1, further comprising, prior to applying the at least one bill classification scheme, applying a rule-based classification scheme.

4. The method of claim 1, wherein the at least one bill classification scheme tolerates false negatives more than false positives.

5. The method of claim 1, wherein the at least one bill classification scheme adjusts for gradual shifts in a population of bills to be classified.

6. The method of claim 1, wherein the at least one bill classification scheme includes a classification for ambiguous bills.

7. The method of claim 1, further comprising automatically verifying, based on the classification, that one or more of the one or more of the second set of electronic medical bills is associated with one or more provided medical services that have been accurately billed and outputting a result of the verification.

8. An apparatus comprising memory comprising programmed instructions stored thereon and one or more processors configured to be capable of executing the stored programmed instructions to:
   derive at least one machine learning bill classification scheme using one or more statistical based decision processes by encoding at least a first set of electronic medical bills to generate at least one sparse binary matrix and generating one or more models using the at least one sparse binary matrix as input to a support vector machine (SVM) process;
   apply to a second set of electronic medical bills the one or more models, wherein at least some of the second set of electronic medical bills comprise different electronic billing forms and the second set of electronic medical bills is different from the first set of electronic medical bills;
   automatically classify one or more of the second set of electronic medical bills as associated with one of a plurality of adjudication types based on the application of the one or more models to the second set of electronic medical bills; and
   insert the classified one or more of the second set of electronic medical bills into an electronic database.

9. The apparatus of claim 8, wherein one of the adjudication types comprises a medical bill origin.

10. The apparatus of claim 8, wherein the one or more processors are further configured to be capable of executing the stored programmed instructions to apply a rule-based classification scheme.

11. The apparatus of claim 8, wherein the at least one bill classification scheme tolerates false negatives more than false positives.

12. The apparatus of claim 8, wherein the at least one bill classification scheme adjusts for gradual shifts in a population of bills to be classified.

13. The apparatus of claim 8, wherein the at least one bill classification scheme includes a classification for ambiguous bills.

14. The apparatus of claim 8, wherein the one or more processors are further configured to be capable of executing the stored programmed instructions to verify, based on the classification, that one or more of the one or more of the second set of electronic medical bills is associated with one or more provided medical services that have been accurately billed and output a result of the verification.

15. A non-transitory computer readable medium having stored thereon instructions for automated electronic document auditing and analysis to facilitate electronic document classification comprising machine executable code which when executed by at least one processor, causes the processor to:
- derive at least one machine learning bill classification scheme using one or more statistical based decision processes by encoding at least a first set of electronic medical bills to generate at least one sparse binary matrix and generating one or more models using the at least one sparse binary matrix as input to a support vector machine (SVM) process;
- apply to a second set of electronic medical bills the one or more models, wherein at least some of the second set of electronic medical bills comprise different electronic billing forms and the second set of electronic medical bills is different from the first set of electronic medical bills;
- automatically classify one or more of the second set of electronic medical bills as associated with one of a plurality of adjudication types based on the application of the one or more models to the second set of electronic medical bills; and
- insert the classified one or more of the second set of electronic medical bills into an electronic database.

16. The medium of claim 15, wherein the at least one bill classification scheme tolerates false negatives more than false positives.

17. The medium of claim 15, wherein the at least one bill classification scheme adjusts for gradual shifts in a population of bills to be classified.

18. The medium of claim 15, wherein the at least one bill classification scheme includes a classification for ambiguous bills.

19. The medium of claim 15, wherein the one of the adjudication types comprises a medical bill origin.

20. The medium of claim 15, wherein the machine executable code, when executed by the processor further causes the processor to apply a rule-based classification scheme.

21. The medium of claim 15, wherein the machine executable code, when executed by the processor further causes the processor to verify, based on the classification, that one or more of the one or more of the second set of electronic medical bills is associated with one or more provided medical services that have been accurately billed and output a result of the verification.

* * * * *